United States Patent [19]

Staley

[11] 4,023,016
[45] May 10, 1977

[54] SIGNAL CHARACTERIZING APPARATUS

[75] Inventor: Lewis E. Staley, Marion, Iowa

[73] Assignee: Rockwell International Corporation, El Segundo, Calif.

[22] Filed: Mar. 25, 1976

[21] Appl. No.: 670,334

[52] U.S. Cl. .......................... 235/150.2; 73/178 R; 324/160

[51] Int. Cl.² .................. G06F 15/34; B64D 43/02; G01P 21/00; G01P 3/50

[58] Field of Search ............... 235/150.2; 73/178 R, 73/488; 324/160

[56] References Cited
UNITED STATES PATENTS 3,617,721  11/1971  Foster .......................... 235/150.2

Primary Examiner—R. Stephen Dildine, Jr.
Attorney, Agent, or Firm—Bruce C. Lutz; Robert J. Crawford

[57] ABSTRACT

A digital circuit for generating an error correction or otherwise characterized signal having a value which changes in accordance with a second signal such as the speed of an airplane (MACH). As a specific example, the generated signal is indicative of the error correction required to the static and derived pilot tube pressure signals which error correction changes non-linearly with respect to the velocity of the airplane. Since, in general, each type of airplane requires its own special correction signal, the apparatus must be readily alterable to a given specific application.

5 Claims, 3 Drawing Figures

FIG. 3

SIGNAL CHARACTERIZING APPARATUS

THE INVENTION

The present invention is generally related to electronics and more specifically related to digital electronics wherein a digital static error correction signal is generated whose value changes in accordance with an input signal indicative of the velocity of an airplane.

The prior art has provided several mechanical implementations of a static source error correcting generator. One approach has been to use a characterized potentiometer whose wiper is moved in accordance with the speed of the airplane. This is a "bootstrapping" arrangement since the exact MACH cannot be determined without knowing the exact static and pitot pressures. Thus, the device must move closer by successively smaller incremental steps until there is no further correction. The generator requires a difference characterization of the potentiometer for each different type of airplane installation.

A second approach is to use a potentiometer having a plurality of taps on the main resistance winding. These taps are then supplied with voltage levels from a signal generator having a plurality of voltage levels and transformers such that the applied signals can be positive or negative and vary in amplitude from tap to tap thereby providing the characterizing function of the error correction while the wiper is moving across the resistance body in accordance with the velocity of the airplane. This approach is one suggested by Aeronautical Radio, Incorporated (ARINC) in ARINC Characterizatic No. 565, issued Feb. 15, 1968. Again, this is a "bootstrapping" arrangement since the exact MACH indication on the wiper will not be known until the exact error correction is known and supplied to the generator producing the MACH indication.

While the present digital implementation is obtained from an algorithm similar to that used in the last mentioned mechanical or analog implementation, it will be realized from a study of the following material that the implementations are only remotely similar since things which are difficult to implement digitally are oftentimes difficult mechanically and vice versa.

It is, therefore, an object of the present invention to illustrate an improved characterized signal generating circuit.

Other objects and advantages of the present invention will be apparent from a reading of the specification and appended claims in conjunction with the drawings wherein:

FIG. 3 is a series of waveforms for use in explaining the circuit of FIG. 1.

DETAILED DESCRIPTION

Figure 1:
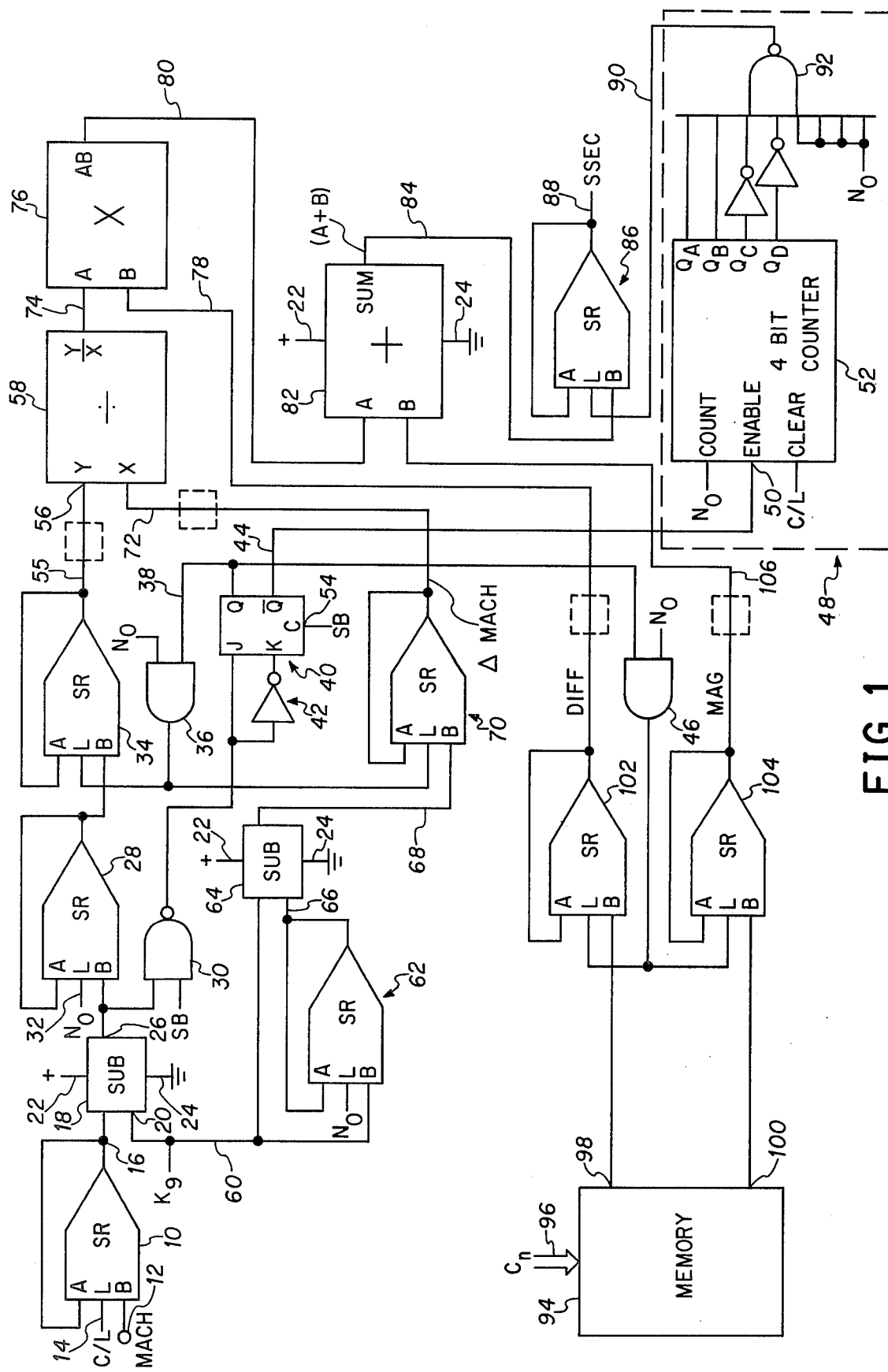
FIG. 1 is a block diagram of on embodiment of the invention.

In FIG. 1, a shift register 10 is illustrated having a B input connected to terminal 12 labeled MACH and a clear/load (C/L) input 14 and having an output 16. The output 16 is coupled back to an A input of the shift register for recirculating an input word until the next occurrence of a clear/load signal on 14 at which time a new value of MACH is loaded in via input B. The output 16 is connected to an input of a subtracting circuit 18 having a second input 20 labeled $K_g$. The subtracting circuit 18 also has an input connected to a positive power terminal 22. A further lead is connected to ground or reference potential. This subtracting circuit, as well as others to be described, is shown in slightly more detail in FIG. 2 for specific connections, and may comprise a CMOS package from RCA sold under the label of a CD4032. While a CD4032 is an adder, it can be used as a limited accuracy subtractor by using a logic inverter (not shown) in series with the subtrahend input. An output 26 of the subtractor circuit 18 is connected to an input of a shift register 28 as well as to an input of a NAND gate 30. NAND gate 30 has an additional sign bit (SB) input. The load (L) input of shift register 28 is connected to an $N_o$ lead further designated as 30. The $N_o$ signal input comprises a one word (16 bit) long pulse occurring the first word time once every 16 words or every subframe of a frame comprising 256 words or 16 subframes. Again, like all other shift registers described herein, the output of shift register 28 is returned to an input for recirculating the input word until the next occurrence of an $N_o$ input at the load terminal. An output of shift register 28 is connected to a further shift register 34 having the load input connected to the output of an AND gate 36 having one of its inputs connected to the $N_o$ lead and the other input connected via a lead 38 to a Q output of JK flip-flop generally designated as 40. An output of NAND gate 30 is connected directly to a J input of JK flip-flop 40 and is inverted in an inverting unit 42 and connected to the K input of JK flip-flop 40. The $\overline{Q}$ output of flip-flop 40 is connected via a line 44 to an input of a dash line block 48 and inside the block to an input 50 of a counting circuit 52. The Q output lead 38 is also connected to an input of an AND gate 46 having an $N_o$ signal as a second input. The JK flip-flop 40 also has the SB signal applied to a clock input thereof at input 54. The output of shift register 34 is connected via a lead 55 to a Y or dividend input 56 of a dividing circuit 58. The dividing circuit 58 may be any dividing circuit which will accept serial bit words but in a preferred embodiment uses the circuit illustrated in a U.S. patent No. 3,816,733 assigned to the same assignee as the present invention. The previously mentioned $K_9$ signal is applied on a lead 60 to an input of a recirculating shift register 62 and to a further subtraction unit 64. The $N_o$ signal is used to load shift register 62 and the output of register 62 is connected as a second input to the subtraction unit 64 on a lead 66. An output of subtractor 64 is supplied on a lead 68 to a shift register 70 which is loaded by an output of AND gate 36. An output of shift register 70 is designated as $\Delta$MACH and is given a designator of 72. Lead 72 is connected to the divisor input of dividing circuit 58. An outpu 74 of divider 58 provides the quotient signal to a multiplicand input of a mulitplier 76 which may be the same as that shown in U.S. Pat. No. 3,761,699. A multiplier input is supplied on a lead 78 labeled Difference from a shift register 102. An output of multiplier 76 appears on lead 80 and is supplied to the input of a summing circuit 82. Summing circuit 82 can be purchased from RCA under P/N CD4032. An output signal is supplied from adding circuit 82 on a lead 84 to an input of a circulating shift register 86. An error correction output signal appears on an output lead 88 from shift register 86 for a full frame of words after initial loading. The block 48 provides an output loading signal on a lead 90 which is obtained from a NAND gate 92 which further is actuated by a count of the counter 52 is combination with a signal received from the $N_o$ pulse.

A read only memory (ROM) or Programmable ROM circuit (PROM) 94 is illustrated with a $C_n$ input 96 and outputs 98 and 100. The output 98 is supplied to a circulating shift register 102 which is loaded via a signal received from AND gate 46. Output 100 is used to provide input signals to a circulating shift register 104 which is also loaded via an actuating signal from AND gate 46. The output of 102 is a difference signal and is synonymous with lead 78. The output of shift register 104 is a magnitude signal indicative of the magnitude of a given error correction signal and is supplied on a lead 106 to a second input of the adding circuit 82.

The memory 94 provides a convenient method to implement the distribution of error correction signals which can be easily altered by merely configuring a new ROM in a different way such that it stores different words or using a PROM so that the memory of a given device can be easily altered. The memory-access binary signals represented by $C_n$ in FIG. 1 are used throughout the main frame of words to output appropriate correction words and difference words for each of the tim periods of the frame as required by the remaining circuitry on the outputs 98 and 100.

Figure 3:
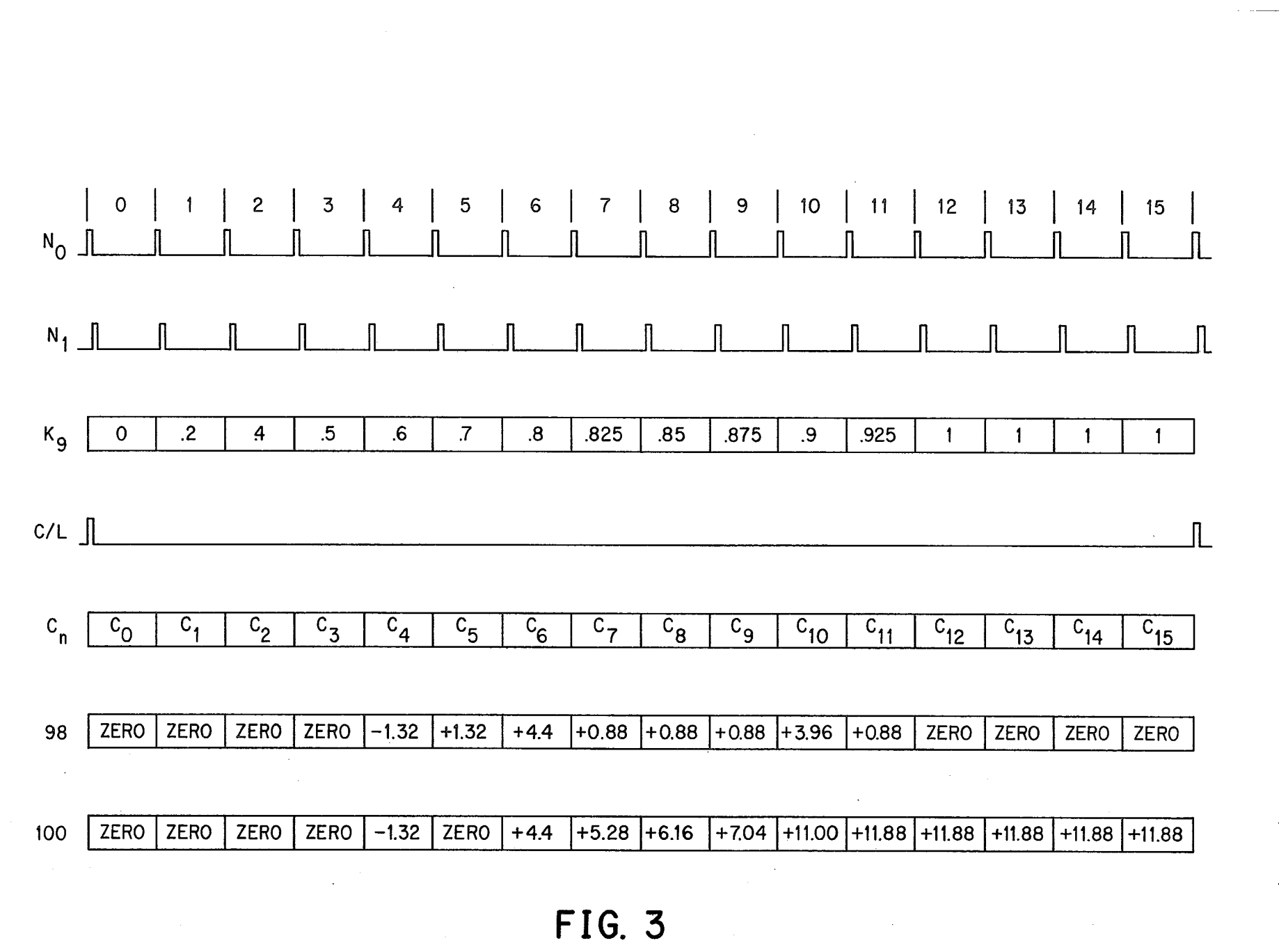

The memory 94 would be programmed such that it would provide the words listed in FIG. 3 waveforms 98 and 100 on the appropriate outputs during the subframes $C_n$ as indicated. The waveform 100 provides a given magnitude correction as required at that particular MACH indication as represented by the similarly situated $K_9$ logic word also shown in FIG. 3. The words provided in waveform 98 are indicative of the difference between the present correction value and the previous correction value. The memory-access binary signals $C_n$ are different for each subframe. This set of binary words can be used to address the memory 94 and output the given words in serial format from the memory continuously each word time of a subframe.

Figure 2:
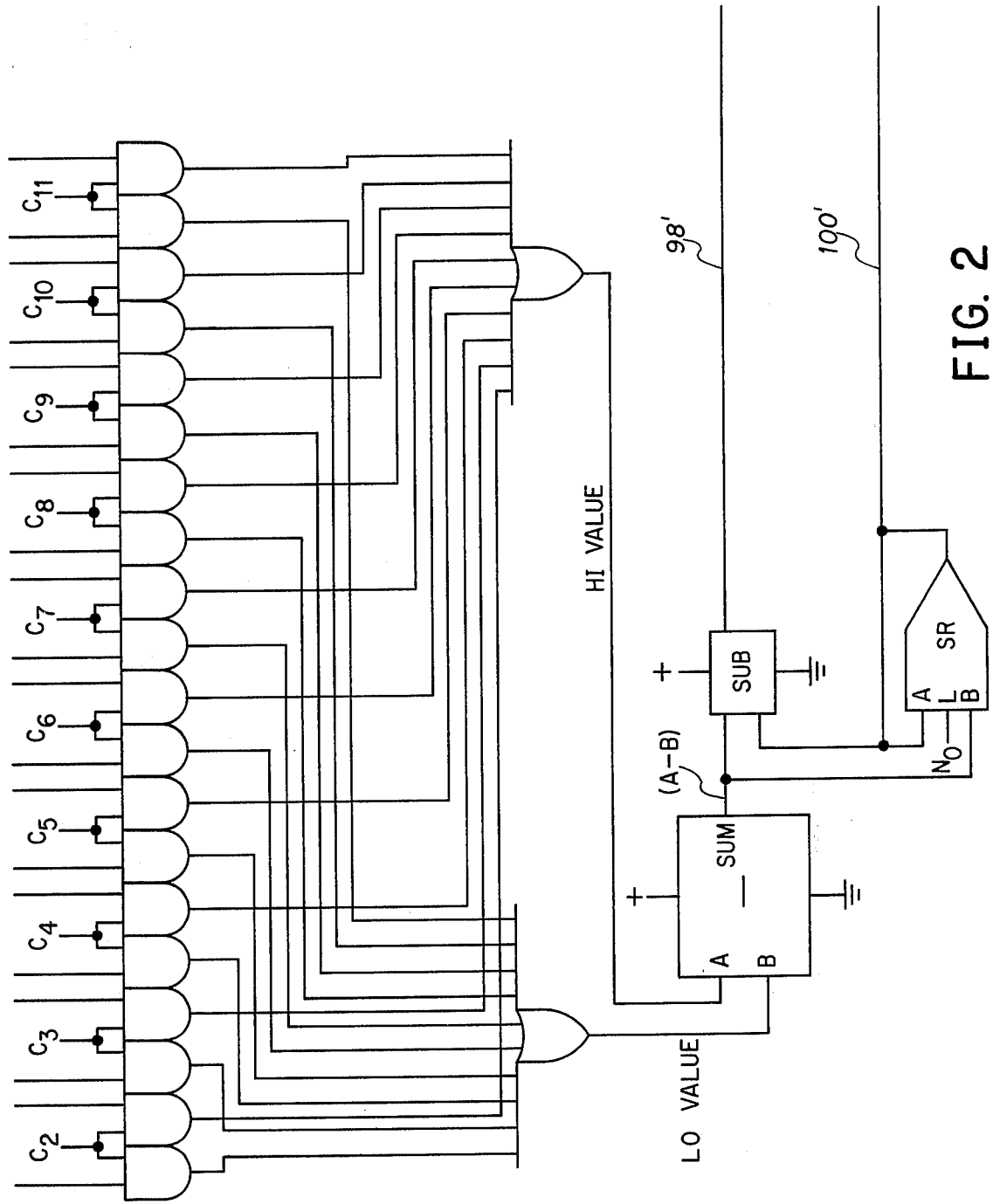
FIG. 2 is a detailed block diagram of apparatus which may be used to substitute for the memory of FIG. 1.

As conceived, FIG. 2 was designed to supply the words shown as being provided by memory 94 of FIG. 1. It will be noted that there are a plurality of AND gates associated in pairs with inputs $C_2$ through $C_{11}$. These inputs are derived from the memory-access binary signals shown in FIG. 3 as $C_n$ and occur in the time periods shown. These $C_2$ through $C_{11}$ signals were used in the original design to pass continuously available serial data words from memory through the two subtractions in multiplex fashion so as to provide the difference and magnitude signals as illustrated in FIG. 1. This original scheme employed a strapping arrangement suggested by ARINC so that as the electronic apparatus was plugged into the aircraft it became "characterized" by the strapping in the aircraft. The preferred embodiment in FIG. 1 characterizes the electronic apparatus by virtue of the particular data stored in memory 94. This is a preferred method for reasons of safety and simplicity.

Since the schematic diagram of FIG. 2 is being presented primarily to illustrate an alternative and original embodiment of the invention with FIG. 1 being the preferred embodiment, further explanation will not be provided other than to indicate that the memory of 94 accomplishes the same end result with fewer parts.

FIG. 3 has been alluded to previously and illustrated various waveforms occurring over a frame of 16 subframes which is the same as 256 word times each being 16 bits in duration. Thus, each frame as illustrated in FIG. 3 is 4,096 bits in duration. As illustrated, the pulses $N_o$ are on word long and occur 16 times during the frame. Immediately upon cessation of the word $N_o$ a second word time commences as is shown in FIG. 3 as waveform $N_1$. The waveform $K_9$ represents the continuous presentation of each word 16 times during its particular subframe and then changing value to that of the next subframe of the frame. Since there are 256 words in a frame, there are also 256 sign bits as represented in FIG. 1 by the abbreviation SB. Each one of these sign bits occur at the end of the word time. The sign bit was not illustrated in FIG. 3 due to the great number of lines presented and the belief that it would not add significantly over that information which may be gleaned from the referenced patents. The C/L, or clear/load signal, is a pulse occuring during the first word of each frame of 256 words. The $C_n$ words are address words or logic value words which occur for an entire subframe of each of the time periods or subframes of the complete frame. The waveform 100 comprises a series of words used in determining the correction factor to be used for a given MACH in the static error correction process. The series of words 98 occur during the same time periods as waveform 100 and are indicative of the difference between a given word in 100 and the previous word used in the series of words of 100.

OPERATION

As previously indicated, the purpose of the circuit of FIG. 1 is to provide an output indicative of the error correction signal which needs to be used for a given MACH or velocity in order to obtain a correction to the measured pressures obtained from the static and pitot tubes. These measured pressures change as to their relative error in accordance with MACH and thus the error correction signal needs to be characterized relative to speed and in accordance with the particular characteristics of a given airplane. Since static and pitot pressures are the factors that are used in determining MACH, the corrected values are then used to generate a new MACH indication and at times will result in further corrections to the correction signal. This is the reason for the previous mention of the fact that the arrangement provided is normally part of a bootstrapping arrangement.

It may be assumed that the MACH provided at input 12 is an indication of 0.55 or 55% of the speed of sound at the given level. During the first subframe the input $K_9$ will be 0 and the subtraction process within subtractor 20 will provide a positive output indication of 0.55. This 0.55 output will appear in two's-complement binary form substantially instantaneously bit-by-bit during the serial word subtraction process. Thus, this 0.55 will be entered into shift register 28 during word time $N_o$ of subframe O. The $K_9$ input of 0 will be entered into shift register 62 during this same word time. During subframe 1, the $K_9$ input will be 0.2 as may be ascertained from FIG. 3 and the output of subtractor 18 will be 0.35. Accordingly, 0.35 will be entered into shift register 28 at the same time that the previously stored word indicative of 0.55 is entered into shift register 34. During word time $N_o$ of subframe 1, subtractor 64 is taking the $K_9$ word 0.2 and subtracting from it the previous $K_9$ word of 0 as stored in shift register 62 and providing the resulting difference output of 0.2 to shift register 70.

Substantially the same process will occur during each of the remaining subframe times until the output of subtractor 18 becomes a negative number. In other words, in subframe 3, a word indicative of the 0.05 difference between $K_9$ and MACH will be stored in shift register 28 and the word 0.5 will be stored in shift register 62. Checking on waveforms 98 and 100 in FIG. 3, it will be determined that at speeds less than 0.5 MACH no correction to the static pressure is required for the particular airplane installation used as as example herein.

During subframe 4, $K_9$ inputs a word indicative of 0.6. At the end of the first word $N_o$ of frame 4, the sign bit will indicate that this is a negative word thereby providing a logic one to the upper input of NAND gate 30. The sign or sync bit SB as also input to NAND gate 30 is a logic one at this time and thereby provides a logic 0 output. As inverted by inverter 42, the JK flip-flop changes its state to provide a logic 0 output on 38. This condition remains in flip-flop 40 until it is again reset by the positive difference appearing at 26 at the beginning of the next frame. Immediately prior to this logic 0 output on 38, the AND gate 36 had been providing a logic one output so that shift registers 34 and 70 were being loaded with an incoming word. In the case of shift register 34, this incoming word was the 0.05 word obtained from the subtraction process in the previous subframe. The word coming into shift register 70 was indicative of the successive differences in two $K_9$ inputs, in other words, the present 0.6 input minus the previously stored 0.5 input which had been circulating in shift register 62. As will be noted, at the second word time N/1 of subframe 4, shift register 62 now contains a 0.6 input and the subtractor 64 provides logic 0 outputs for the remainder of the subframe. During word time $N_o$ of subframe 4, the memory 94 was providing an output word indicative of minus 1.32 on both outputs 98 and 100.

The serial digital words starting with least significant bit first are outputted on lines 98 and 100 to the respective shift registers 102 and 104. The loading of these two shift registers has been accomplished via AND gate 46 on the same basis as occurred with respect to shift registers 34 and 70. Thus, these two shift registers, in accordance with FIG. 3, each have the word −1.32 stored therein. Although these happen to be the same number for subframe 4, the word in shift register 104 is indicative of the error correction magnitude for that MACH while the word in 102 is indicative of the difference between the present magnitude and the previous magnitude. Since the previous magnitude was 0, the difference is identical to the magnitude.

At the start of the second word time N/1 in subframe 4, the divider 58 commences dividing the difference between MACH and the closest lower $K_9$ value as obtained in the previous subtraction subframe 3 by the difference between the present $K_9$ and the previous $K_9$ MACH values as the first step in solving the equation below:

$$COR_{ssec} = COR_{.5} + d_2/d_1 (COR_{.6} - COR_{.5})$$

This equation can be related to the apparatus of this patent and more particularly to the specific example supra where MACH = 0.55 as follows. The quantity $d_2$ represents the difference between MACH and the next closest $K_9$ value as obtained from shift register 28. The quantity $d_1$ represents the difference between successive $K_9$ values, more particularly MACH = 0.6 and MACH = 0.5 for this example. The correction value $COR_{.5}$ is the amount of static source error correction required at MACH = 0.5 and the signal appears on line 100 when $K_9 = .6$. The correction value $(COR_{.6} - COR_{.5})$ is the difference between the correction required at MACH = .6 and MACH = .5; it is equivalent to the signal on line 98 of this apparatus when $K_9 = .6$. In other words, the desired correction value $COR_{ssec}$ is equal to the correction value at MACH = .5 plus a proportional amount $(d_2/d_1)$ of the difference in correction values at MACH = .6 and MACH = .5.

This dividend output appearing on 74 is multiplied times the correction difference quantity $(COR_{.6} - COR_{.5})$ as supplied on lead 78 in multiplier 76. The product is then added to the previous magnitude $(COR_{.5})$ in adder 82. The three arithmetic calculations are performed in series. When the division process is finished, the quotient is supplied to the multiplier. When the multiplication process is finished, the product is supplied to the adder.

Thus, the counter 52 was used to enable the loading of the shift register 86 at the appropriate word time when the appropriate correction value is flowing out of the adder 82.

It will be noted that there are dash line blocks in each of lines 55, 72, 78 and 106. In the preferred embodiment, the apparatus in block 48 is replaced by one frame time shift register at the points shown by dash lines in the four lines just mentioned. These four shift registers and item 86 are then loaded by the clear and load (C/L) signal. The system was revamped accordingly to use the simpler resulting structure thereby allowing the elimination of the four-bit counter and associated hardware. The end result was simplification of the entire system.

The present application has illustrated both an initial concept of the invention and a preferred embodiment for a more complete disclosure. This is not to be inferred that these are the only implementations of the inventive concept and I wish to include all other alterations within the scope of my idea. Thus, I wish to be limited only by the scope of the appended claims.

What is claimed is:

1. Signal generating means comprising, in combination:
   first means for supplying a first signal indicative in magnitude of a variable parameter;
   second means for supplying a second signal comprising a first series of predetermined and periodically recurring magnitudes;
   third means, connected to said first and second means, for providing an output third signal indicative of the last difference between said first and second signals prior to the time when the relative magnitude of said first signal with respect to the second signal changes sign;
   fourth means for supplying a fourth signal from a second series of predetermined and periodically recurring magnitudes simultaneous with the occurrence of said third signal;
   fifth means for supplying a fifth signal from a third series of periodically recurring magnitudes indicative of the difference between time adjacent magnitudes of said second series of magnitudes simultaneous with the occurrence of said third signal;
   sixth means for supplying a sixth signal from a series of periodically recurring magnitudes indicative of the difference between the present magnitude of said first series of magnitudes and the previous magnitude thereof simultaneous with the occurrence of said third signal;

seventh means, connected to said third, fourth, fifth and sixth means, for multiplying the ratio of said third and sixth signals times said fifth signal and adding thereto the fourth signal whereby a resultant seventh signal output is obtained.

2. Apparatus as claimed in claim 1 wherein:
said seventh means includes means for dividing said third signal by said sixth signal to obtain the ratio thereof.

3. Apparatus as claimed in claim 1 wherein:
said signals are serially generated digital words;
said first signal is indicative of MACH;
said seventh signal is indicative of static pressure correction for a given MACH input; and
said fifth means includes digital word time delay and digital word subtraction means for generating said third series of magnitudes.

4. The method of generating a digital static source error correction signal corresponding to a given MACH comprising the steps of:

subtracting a digital signal indicative of MACH from a first series of unidirectionally changing magnitude digital words to provide a second series of digital difference words;

generating a control signal when the second series of words changes sign;

generating a third series of digital words indicative of error correction values corresponding to magnitudes of said first series of words;

generating a fourth series of digital words indicative of the difference in value between adjacent words in said third series of words;

subtracting adjacent digital words from said first series of digital words to produce a fifth series of digital word ΔMACH signals;

dividing a digital word obtained from said second series of words in response to said signal by a digital word obtained from said fifth series of words in response to said control signal to obtain a digital word ratio signal;

multiplying said ratio signal by a digital word obtained from said fourth series of words in response to said conrol signal to obtain a digital word product signal; and adding a digital word obtained from said third series of words in response to said control signal to said product signal to obtain a digital word static source error correction signal.

5. Apparatus for generating a digital static source error correction signal corresponding to a given MACH comprising, in combination:

first means for subtracting a digital signal indicative of MACH from a first series of unidirectionally changing magnitude digital words to provide a second series of digital difference words;

second means, connected to said first means, for generating a control signal when the second series of words changes sign;

third means for generating a third series of digital words indicative of error correction values corresponding to magnitudes of said first series of words;

fourth means for generating a fourth series of digital words corresponding to the difference between adjacent words of said third series;

fifth means for subtracting adjacent digital words from said first series of digital words to produce a fifth series of digital word ΔMACH signals;

means connecting said second means to said first means, said third means, said fourth means and said fifth means for outputting therefrom given digital words of the respective series of words in response to receipt of said control signal;

sixth means, connected to said first means and said fifth means, for dividing a digital word obtained from said second series of words by a digital word obtained from said fifth series of words to obtain a digital word ratio signal;

seventh means, connected to said sixth means and said fourth means, for multiplying said ratio signal by a digital word obtained from said fourth series of words to obtain a digital word produce signal; and eighth means, connected to said seventh means and said third means for adding a digital word obtained from said third series of words in response to said control signal to said product signal to obtain a digital word static source error correction signal.

* * * * *